(12) United States Patent
    Nadkarni et al.

(10) Patent No.: US 11,140,566 B2
(45) Date of Patent: Oct. 5, 2021

(54) MATCHING USER AND CONTROL PLANE DATA IN A NETWORK SYSTEM USING CONTROL AND USER PLANE SEPARATION

(71) Applicant: NetScout Systems, Inc, Westford, MA (US)

(72) Inventors: Rajeev Nadkarni, Chelmsford, MA (US); Abhishek Saraswati, Santa Clara, CA (US); Anil K. Singhal, Carlisle, MA (US); Bruce A. Kelley, Jr., Westford, MA (US); Narendra Byrapuram, Westford, MA (US); John Peter Curtin, Richardson, TX (US); Tauras Liubinskas, Lexington, KY (US)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 16/849,480

(22) Filed: Apr. 15, 2020

(65) Prior Publication Data

US 2020/0344623 A1    Oct. 29, 2020

Related U.S. Application Data

(60) Provisional application No. 62/834,182, filed on Apr. 15, 2019.

(51) Int. Cl.
    *H04W 24/08*    (2009.01)
    *H04L 12/26*    (2006.01)
    *H04W 84/04*    (2009.01)

(52) U.S. Cl.
    CPC ............. *H04W 24/08* (2013.01); *H04L 43/04* (2013.01); *H04L 43/12* (2013.01); *H04W 84/042* (2013.01)

(58) Field of Classification Search
    CPC ........ H04L 43/12; H04L 43/04; H04W 24/08; H04W 24/04; H04W 84/042
    See application file for complete search history.

(56) References Cited

U.S. PATENT DOCUMENTS

| | | |
|---|---|---|
| 8,582,454 B2 | 11/2013 | Singhal et al. |
| 2010/0211675 A1* | 8/2010 | Ainali ................. H04L 43/0888 709/224 |

(Continued)

FOREIGN PATENT DOCUMENTS

WO    WO-2019201435 A1 *  10/2019   ......... H04L 65/1016

*Primary Examiner* — Hassan Kizou
*Assistant Examiner* — Hector Reyes
(74) *Attorney, Agent, or Firm* — Locke Lord LLP; Scott D. Wofsy; Christopher J. Capelli

(57) ABSTRACT

A system having a network monitor communicating with U and C probes monitoring SGW-U and SGW-Cs. The U probes buffer captured user plane packets from which they determine new sessions and send new session data to the network monitor, the new session data including an IP address pair of the corresponding U probe and SGW-U. The C probes inspect captured control plane packets, determine control plane packets having a same IP address as an SGW-U in the new session data, and send associated control data to a particular U probe having the IP address paired with the IP address of the SGW-U, wherein the particular U probe correlates the control data with buffered user plane packets and generates associated monitoring data.

26 Claims, 5 Drawing Sheets

(56) References Cited

U.S. PATENT DOCUMENTS

| | | | | |
|---|---|---|---|---|
| 2011/0249572 A1* | 10/2011 | Singhal | ................... | H04L 43/08 |
| | | | | 370/252 |
| 2014/0101305 A1* | 4/2014 | Kelley, Jr. | ............... | H04L 45/24 |
| | | | | 709/224 |
| 2016/0204996 A1* | 7/2016 | Lindgren | .............. | H04L 41/082 |
| | | | | 709/224 |
| 2017/0214790 A1* | 7/2017 | Sun | ..................... | H04L 65/1006 |

* cited by examiner

MATCHING USER AND CONTROL PLANE DATA IN A NETWORK SYSTEM USING CONTROL AND USER PLANE SEPARATION

BACKGROUND

This invention relates generally to monitoring data packets transmitted over a network, and more specifically to real-time matching user and control plane data in a network system using control and user plane separation (CUPS).

Control and user plane separation (CUPS) used in 3G, 4G, 4GLTE, and 5G provides network scalability. 5G, still in the early stage of being adopted and supported by network service providers, provides for physical separation of the user and control planes. For example, session gateway (SGW) for a network's control plane can be disposed in a different city than one or more cities where the network's user plane is located. This physical separation allows 5G to handle increased capacity of network traffic with minimal increase, if any, in latency.

Besides providing scalability to networks, CUPS enables user plane programmability. This means that different sets of user plane nodes can be selected to be used for a particular role. Examples of different roles include inter-car communication; intra-car communication between different components; traffic signals; voice communication.

As network traffic increases and the user plane expands, it can be a challenge to provide a network monitoring system that monitors (to assess and/or control) network performance without burdening the network. Among the challenges are providing a network monitoring system that can correlate user plane and control plane traffic, event when the user and control planes are physically remote from one another, allow for scalability of the network monitoring system as the user and/or control planes increase in size and capacity, and support user plane programmability.

There remains a need to efficiently monitor a network, including correlating separated user plane traffic and control plane traffic while retaining scalability of the network, without burdening the network being monitored.

SUMMARY

Certain aspects of the present disclosure relate to monitoring network traffic data. In accordance with a purpose of the illustrated embodiments, in one aspect, a system for correlating user plane and control plane data are provided. The system includes a network monitor configured to communicate with a plurality of U probes and a plurality of C probes associated with the network monitor. The plurality of U probes are configured to monitor at least one SGW-U operating on user plane traffic of network traffic and the plurality of C probes are configured to monitor at least one SGW-C operating on control plane traffic of the network traffic. The plurality of U probes are configured to buffer user plane packets captured from the at least one SGW-U, determine each of the captured user plane packets that are associated with respective new sessions, and send to the network monitor new session data based on the user plane packets determined to be associated with the respective new sessions. The new session data includes an IP address pair of each of the U probe and the SGW-U that processed the corresponding user plane packet, The system further includes a plurality of C probes configured to communicate with the network monitor and at least a portion of the plurality of U-probes, receive the new session data from the network monitor, inspect control plane packets captured from the at least one SGW-C, determine one or more control plane packets of the captured control plane packets having a same IP address of an SGW-U that is included in the new session data, and send control data associated with the one or more determined control plane packets to a particular U probe of the plurality of U probes having the IP address paired with the IP address of the SGW-U. The particular U probe is further configured to correlate the control data with one or more of the user plane packets that were buffered, and generate monitoring data based on the correlated control data and user plane packets.

In one or more embodiments, the plurality of C probes can be further configured to select predetermined fields from the control plane packet to be included in the control data.

In one or more embodiments, the selected predetermined fields can include fields for holding information about at least one of international mobile subscriber identity (IMSI), mobile station international subscriber directory number (MSISDN), international mobile station equipment identity and software version number (IMEI-SV), and Cell-Id.

In one or more embodiments, the plurality of U probes can be further configured to buffer the user plane packets with respective timestamps indicating a time of being captured or buffered, and the particular U probe can wait a predetermined delay time from the timestamp that a user packet was received before correlating that user packet with the control data.

In one or more embodiments, the network monitor can send all unsent new session data periodically to all of the C probes of the plurality of C probes, wherein previously sent new session data can be considered as old session data.

In one or more embodiments, the network monitor can monitor one or more of 5G, 4G, and Wi-Fi protocols.

In one or more embodiments, the system can further include a new U probe that was added to the plurality of U probes by registering itself with the network monitor during operation of the network and performing functions for which the plurality of U probes are configured.

In one or more embodiments, the system can further include a new C probe that was added to the plurality of C probes by registering itself with the network monitor during operation of the network and performing the functions for which the plurality of C probes are configured.

In one or more embodiments, the particular U probe can be configured to perform deep packet inspection in order to access fields in the buffered user plane packets that correspond to fields included in the content data.

In one or more embodiments, the plurality of C probes can be configured to perform deep packet inspection in order access the predetermined packets from the control plane packets.

In one or more embodiments, the monitoring data can include Adaptive Service Intelligence (ASI) data.

In one or more embodiments, at least one of the network monitor and the particular U probe can use the monitoring data to determine a characteristic of the network traffic.

In one or more embodiments, the characteristic of the network traffic can include at least one of quality of service, performance, and end user experience.

In one or more embodiments, the plurality of U probes can receive the captured user plane packets via a tap that monitors the SGW-U.

In one or more embodiments, the plurality of C probes can receive the captured control plane packets via a tap that monitors the SGW-C.

In one or more embodiments, the plurality of C probes can be adapted to a protocol being used by the network, wherein adapting the plurality of C probes includes adjusting the predetermined fields for selecting information from the control plane packets to be included in the control data.

In one or more embodiments, the particular U probe can perform deep packet inspection to determine whether a user packet is associated with a new session and for obtaining the new session data.

In one or more embodiments, the particular U probe, for the purpose of correlating the user packets with the control data, can limit the deep packet inspection performed on the buffered user packets to deep packet inspection needed for determining a new session and extracting the new session data.

In one or more embodiments, inspecting by the plurality of C probes, for the purpose of correlating the user packets with the control data, can include performing deep packet inspection.

In one or more embodiments, the plurality of C probes can limit the deep packet inspection performed on the buffered control plane packets, for the purpose of correlating the user packets with the control data, to deep packet inspection needed for extracting the control data.

In accordance with a further aspect of the disclosure, a method is performed by a network monitor for correlating user plane and control plane data. The method includes receiving, from a plurality of U probes that detected one or more new sessions, new session data that includes data about the detected one or more new sessions and buffering the new session data, wherein the plurality of U probes are configured to monitor at least one SGW-U operating on user plane traffic of network traffic and buffer user plane packets captured from the at least one SGW-U, and wherein the new session data includes an IP address pair of each of the U probe and the SGW-U that processed a user plane packet that is associated with a start of a new session.

The method further includes sending the new session data to a plurality of C probes associated with the network monitor, wherein the plurality of C probes are configured to monitor at least one SGW-C operating on control plane traffic of the network traffic, buffer and perform deep packet inspection on captured control plane packets of the control plane traffic, determine one or more control plane packets of the captured control plane packets having a same IP address as an SGW-U that is included in the new session data, and send control data associated with the one or more determined control plane packets to a particular U probe of the plurality of U probes having the IP address paired with the IP address of the SGW-U.

The method further includes receiving, from the particular U probe, monitoring data based on the correlated control data that can be used to determine a characteristic of the network traffic, wherein the particular U probe is configured to correlate, after a delay, the control data with one or more user plane packets that were buffered for providing the monitoring data.

In one or more embodiments, the method can further include periodically sending all new session data that was not sent yet about the at least one new session to all of the plurality of C probes, wherein previously sent new session data can be considered as old session data.

In one or more embodiments, the method can further include using the monitoring data to determine a characteristic of the network traffic, wherein the characteristic of the network traffic includes at least one of quality of service, performance, and end user experience.

In accordance with another aspect of the disclosure, a method is performed by a C probe of a plurality of C probes for correlating user plane and control plane data. The method includes receiving from a network monitor to which the C probe is associated new session data, wherein the new session data was provided to the network monitor by a plurality of U probes that detected one or more new sessions, wherein the new session data includes data about the detected one or more new sessions, and wherein the plurality of U probes are configured to monitor at least one SGW-U operating on user plane traffic of network traffic and buffer user plane packets captured from the at least one SGW-U, and wherein the new session data includes an IP address pair of each of the U probe and the SGW-U that processed a user plane packet that is associated with a start of a new session.

The method further includes monitoring at least one SGW-C operating on control plane traffic of the network traffic, capturing and buffering control plane packets of the control plane traffic, and performing deep packet inspection on the captured control plane packets, wherein the deep packet inspection is limited to deep packet inspection needed to access IP addresses. The method further includes determining one or more control packets of the captured control plane packets having a same IP address as an SGW-U that is included in the new session data, selecting control data from the one or more determined control plane packets, and sending only the selected control data to a particular U probe of the plurality of U probes, wherein the particular U probe has an IP address associated with the SGW-U's IP address and the particular U probe is configured to correlate, after a delay, the selected control data with one or more of the user U plane packets that were buffered for providing to the network monitor monitoring data that is based on the correlated control data that can be used to determine a characteristic of the network traffic.

In one or more embodiments, the selected control data can be obtained from predetermined fields of the control plane packets, wherein the predetermined fields include fields for holding information about at least one of international mobile subscriber identity (IMSI), mobile station international subscriber directory number (MSISDN), international mobile station equipment identity and software version number (IMEI-SV), and Cell-Id.

In accordance with an additional aspect of the disclosure, a method is provided that is performed by a U probe of a plurality of U probes for correlating user plane and control plane data. The method includes monitoring at least one SGW-U operating on user plane traffic of network traffic, buffering user plane packets captured from the at least one SGW-U, determining each of the captured user plane packets that are associated with respective new sessions, and sending to the network monitor new session data based on the user plane packets determined to be associated with the new session. The new session data includes an IP address pair of each of the U probe and the SGW-U that processed the corresponding user plane packet. The method further includes receiving control data from a plurality of C probes, wherein the plurality of C probes are configured to monitor at least one SGW-C operating on control plane traffic of the network traffic, buffer and perform deep packet inspection on captured control plane packets of the control plane traffic, determine one or more control packets of the captured control plane packets having a same IP address as an SGW-U that is included in the new session data, and send control data associated with the one or more determined control plane packets to a particular U probe of the plurality of U probes having the IP address paired with the IP address of the SGW-U.

The method further includes correlating the control data with one or more user plane packets that were buffered, generating monitoring data based on the correlated control data, and providing the monitoring data to the network monitor for determination of a characteristic of the network data.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DETAILED DESCRIPTION

Figure 1:
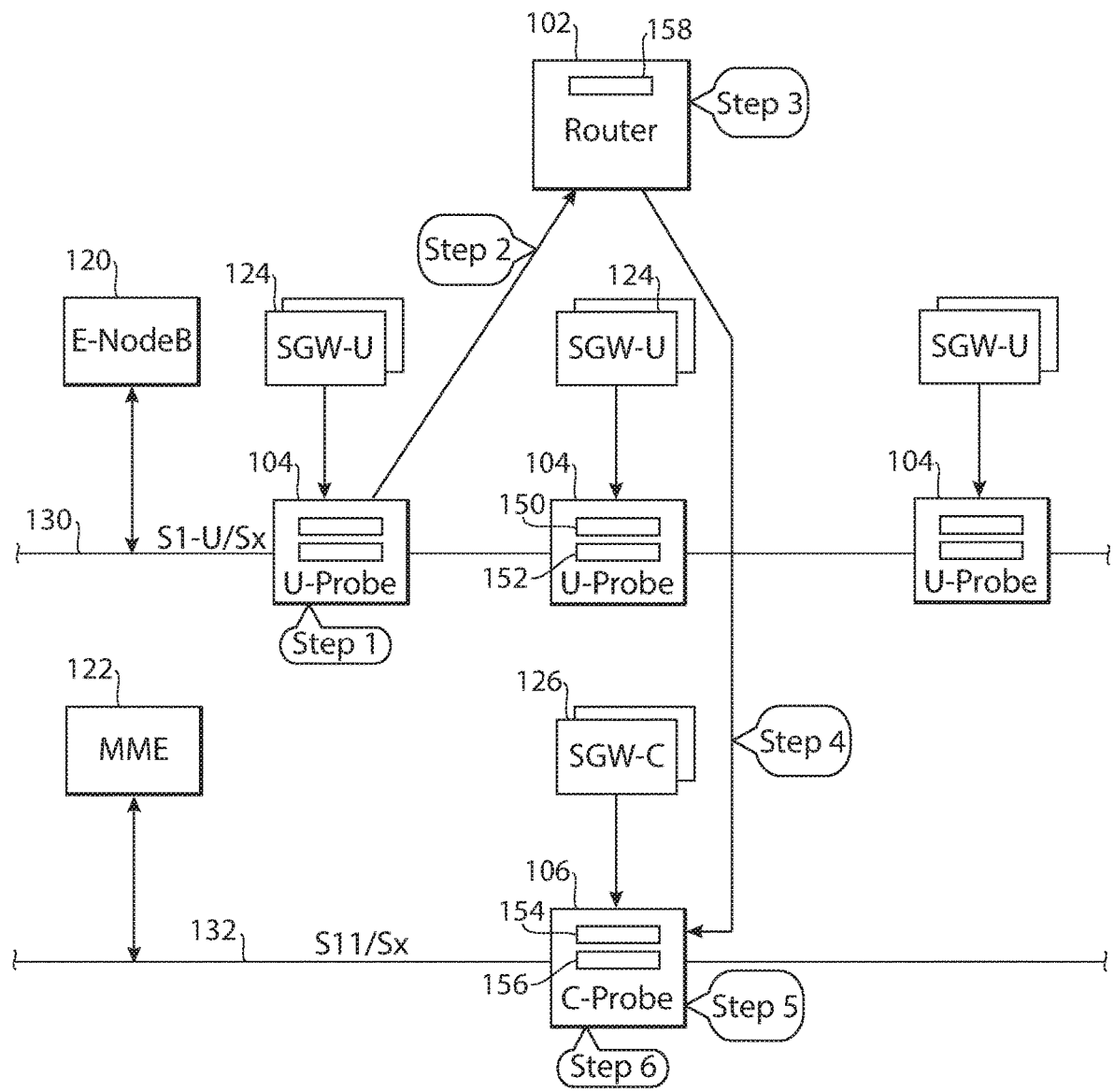
FIG. 1 is a diagram illustrating elements or components of an example network monitoring system in an operating in accordance with embodiments of the present disclosure.

The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

In the context of the present description, the terms "network" and "communication network" refer to the hardware and software connecting one or more communication elements including wireline networks, wireless networks, and/or combinations thereof.

FIG. 1 is a diagram illustrating elements or components of an example operating environment in which embodiments of the present invention may be implemented. It is noted that the access network of FIG. 1 is merely one example of a possible access network, and embodiments may be implemented in any of various access networks, as desired.

As shown, FIG. 1 illustrates an embodiment of a network monitoring system 100 monitors an access network, such as an access network that provides cellular or Wi-Fi communication to mobile or stationary devices. The network monitoring system 100 uses a method for correlating user packets and control plane packets of network traffic detected by probes monitoring a session gateway (SGW) operating in the user plane (referred to as SGW-U) and an SGW operating in the control plane (referred to as a SGW-C) gateways. The probes monitoring the SGW-U are referred to herein as U probes, and the probes monitoring the SGW-C are referred to herein as C probes. The correlation can be performed even when the SGW-U gateway and SGW-C gateway are physically and/or logically separated from one another, without knowledge of processing performed by one another.

The disclosed method uses deep packet inspection (DPI) by the U probes and C probes of respective user plane and control plane packets and shares minimal information over the network in order for the correlation to be possible. A network monitor shares with the C probes minimal data about a new session, such as data about endpoints of new sessions detected by the U probes. The endpoints include the IP addresses of the SGW-U that processed packets of the new session that was detected and the U probe that detected the new session. Using the new session data, the C probes are able to provide only selected control plane data to the U probes that are relevant to the new sessions detected by the receiving U probe. By minimizing the amount of information shared, the monitoring network system 100 places a minimal burden on the access network being monitored.

In this way, the U probes have access to sufficient control plane data to correlate with user plane packets buffered by the U probes. For example, the U probes can correlate user plane packets with the control plane data based on predetermined criteria, such as based on belonging to the same session, using a particular type of handset, being associated with a particular subscriber, originating from a particular IP address, etc. The correlated user plane data and control plane data can be processed to determine statistics (e.g., KPIs), used to monitor characteristics of the network, such as quality of service, performance, end user experience, etc., to detect trends, or make predictions, and can further be used to make adjustments, e.g., to add or remove components to or from the network or adjust parameters of components in the network.

The example portion of the access network shown includes eNodeB 120, MME 122, SGW-Us 124, and SGW-C 126, among other components. SGW-U 124 and SGW-C 126 can be servers that are located in physically remote locations relative to one another, each SGW-U 124 and SGW-C 126 having its own IP address. The interfaces provided between these components can be compatible with different protocols, including 5G, 4G LTE, and Wi-Fi protocols. The number of each component shown, including the eNodeB 120, MME 122, SGW-Us 124, and SGW-C 126 is illustrative, and single or multiple instances of each node can be provided.

The eNodeBs 120 can communicate over a transmission medium (an interface) with one or more user devices (not shown). User devices may be referred to herein as "user equipment" (UE). Thus, the user devices are referred to as UEs or UE devices. UE devices may include any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

eNodeBs 120 may include or be associated with one or more cells. For example, each cell may include a radio frequency (RF) transceiver facing a particular direction. eNodeBs 120 may interface with the access network via an interface referred to as an S1 interface, which may be split into a control plane S1-MME interface (not shown) and a data plane S1-U/Sx interface 130.

MME 122 may implement control plane processing for the access network. For example, MME 122 may implement tracking and paging procedures for the UE, may activate and deactivate bearers for the UE, may authenticate a user of the UE, and may interface to networks using different protocols, such as 5G, 4G, LTE, and Wi-Fi. MME 124 may also select a particular SGW-C 126 for a particular UE. A particular MME 124 may interface with other MMEs (not shown) in the access network and may send and receive information associated with UEs, which may allow one MME device to take over control plane processing of UEs serviced by another MME, if the other MME becomes unavailable.

SGW-U 124 processes user plane packets, such as by routing and forwarding the user data packets. SGW-C 126 processes control plane packets, such as by creating and handling sessions and acting as a mobility anchor during inter-eNodeB 104 handovers. As noted above, SGW-U 124 and eNodeBs 120 communicate over one or more S1-U/Sx 130. SGW-C 126 and MME 122 communicate over an S11/Sx link 132.

The UE typically generates and transmits a request to create or break down a session to the MME 122 over the S1-MME interface (e.g., using S1-AP protocol). In response to receiving the request, the MME 122 generates and transmits a create session request to the SGW-C 126. The MME 122 communicates the create session request to the SGW-C 126 over the S11/Sx interface 132 that is adapted to accommodate the request. Additionally, the eNodeBs 120 communicates the user plane packets to the SGW-U in the user plane over the S1-U/Sx interface 130. In embodiments, the user plane IP traffic can be carried within encapsulated unidirectional tunnels (e.g., GTP-U) tunnels for specific user's flows called sessions. Each session has a unique tunnel identifier. The user plane IP traffic can be embedded within transport layer addresses (i.e., source and destination IP addresses of the network devices).

A plurality of taps (not shown in FIG. 1) are provided to capture traffic transmitted within the access network 100. The taps are connections to the various transmission links (e.g., used to transmit GTP-U tunnels or GTP-C packets) and are designed to copy packets transmitted through the links and provide the copied packets to the U probes 104 or C probes 106 (indicated by the arrows from SGW-U 124 to U probe 104 and SGW-C 126 to C probe 106) so that the U probes 104 and C probes 106 can monitor the performance of the network and the quality of the user experience by analyzing the packets. The taps, such as passive taps, filterable taps, and others, include, but are not limited to XFP ports, UTP ports, SFP ports, or other similar means of capturing the transmitted packets for analysis.

The U probes 104 or C probes 106 may be configured as hardware, software, firmware, or combination thereof, for monitoring data transmission through the S1a-U/Sx interface 130 and the S11/Sx interface 132. The U probes are configured with a user plane buffer 150 to buffer user plane packets captured from an associated SGW-U 124 and a control data buffer 152 to buffer selected control data provided by any of the C probes 106. The C probes are configured with an Rx new session buffer 154 to buffer data about a new session received from the network monitor 102 and a control plane buffer 156 to buffer control plane packets captured from an associated SGW-C 126. The U probes 104 or C probes 106 may each be configured as a special purpose computing device or a software component (not limited to a single process) dedicated to monitoring data communicated via the network 100. Alternatively, the U probes 104 or C probes 106 may each be configured as a general purpose computing device with specialized software components installed thereon. In one embodiment, the U probes 104 or C probes 106 are nGenius InfiniStream probes available from NetScout Systems, Inc. of Westford, Mass.

In this example, after correlating the packets (user plane and control plane), the U probe 104 selectively generates an Adaptive Service Intelligence (ASI) data set that can include key performance indicators and Adaptive Session Records ("ASRs") as described in U.S. patent application Ser. No. 12/756,638 entitled "Real-Time Adaptive Processing of Network Data Packets for Analysis" and filed on Apr. 8, 2010, now U.S. Pat. No. 8,582,454, the entire contents of which are incorporated by reference. The methods and systems described in U.S. patent application Ser. No. 12/756,638 enable the U probe 104 to analyze network performance and end user experience in real-time, without extensive network buffering and analysis.

Furthermore, according to an embodiment of the present invention, the U probe 104 is configured to generate basic KPIs and meta data metrics, e.g., for all subscribers, selected subscribers, all control and user plane traffic, or selected control and user plane traffic. Basic KPIs and meta data metrics may include Key Traffic Indicators (KTIs), such as, but not limited to, volume, utilization rate, and throughput metrics. The advanced set of metrics typically provides additional assistance in troubleshooting and may include, but is not limited to, the following metrics: network errors, network congestion, jitter, latency, transaction response times, timeouts, as well as various quality of service characteristics (e.g., for video and Voice over IP traffic).

The network monitor 102 is a server configured to communicate with the U probes 104 and C probes 106, e.g., via communication links 140, to receive data about a new session from the U probes 104 and periodically transmit the new session data to one or more C probes 106. Previously sent new session data can be considered as old session data so that it is no longer treated as new session data. In embodiments, the network monitor 102 can be a router. Communication links 140 can be links of the access network or can be external to the access network. The network monitor 102 is configured with a Tx new session buffer 158 to buffer new session data received from the U probes 104 before sending the new data about the session to the C probes 106. The network monitor 102 may be configured as a special purpose computing device or a software component (not limited to a single process) dedicated to communicating with the U probes 104 and C probes 106. Alternatively, the server 102 may be configured as a general purpose computing device with specialized software components installed thereon. In one embodiment, the network monitor 102 is an nGeniusOne available from NetScout Systems, Inc. of Westford, Mass.

In order to join the network monitoring system 100, the U probes 104 and C probes 106 are registered with the network monitor 102. When a new U probe 104 or C probe 106 is added, it requests registration from the appropriate network monitor 102 (usually the closest network monitor or possibly several network monitors of the network monitoring system 100), undergoes a verification and authorization process with the network monitor 102, and provides any information requested by the network monitor 100. The network monitor 100 stores information about each registered U probe 104 and C probe 106, and uses that information to communicate with the U probes 104 and C probes 106 while monitoring is in process.

FIG. 1 shows a first set of steps that are performed during monitoring of the access network. At Step 1, each U probe 104 receives user plane packets captured from one or more SGW-Us 124, detects user plane packets associated with a new session, inspects the detected user plane packets, and extracts the IP address of the SGW-U 124 by which the inspected user plane packet was handled. This step can also include storing the received user plane packets in its user plane buffer 150. At Step 2, the U probe 104, for each detected user plane packet, sends a new session message, including new data about the session with its own IP address and the extracted IP address of the associated SGW-U 124, to the network monitor 102. Each U probe 104 can detect multiple new sessions from the same SGW-U 124 and/or from multiple SGW-Us 124. At step 3, the network monitor 102 stores the new data about the session received in new session messages as a new entry in its Tx new session data buffer 158.

Figure 2:
FIG. 2 is a diagram of a new session table stored by a network monitor of the network monitoring system in accordance with embodiments of the present disclosure.

With reference to FIG. 2, an example Tx new session data buffer 158 stored by the network monitor 102 is shown. Each entry 202 includes the IP address of the U probe 104 that sent the new session message for that entry, and the corresponding IP address of the SGW-U 124 from the new session message. The network monitor 102 can maintain the Tx new session data buffer 158 by removing entries no longer needed, such entries that have been stored for a predetermined interval of time or entries that have already been sent to the C probes 106. The C probes 106 can store the data about the new session received from the network monitor 102 as entries similar to entries 202 in its Rx new session data buffer 154.

With returned reference to FIG. 1, at Step 4, the network monitor 102 sends new entry data from its Tx new session data buffer 158 to each of the C probes 106 that are registered with the network monitor 102. The transmitted new entry data can include all of the data currently stored in the Tx new session data buffer 158, or can only include newly added entries that were added since the last transmission of data about the new session to the C probes 106, also referred to as fresh data. Transmissions of new session data buffer 158 can be performed at regular predetermined intervals, and/or can be triggered by an event, such as detection of a high volume of newly added entries or the Tx new session data buffer 158 reaching a threshold size.

At Step 5, each C probe 106 that received the data about the new session from the network monitor 102 stores the data about the new session in its Rx new session data buffer 154. At Step 6, each C probe 106 receives control plane packets captured from one or more SGW-Cs 126 and buffers the received control plane packets in its control plane buffer 156.

Figure 3:
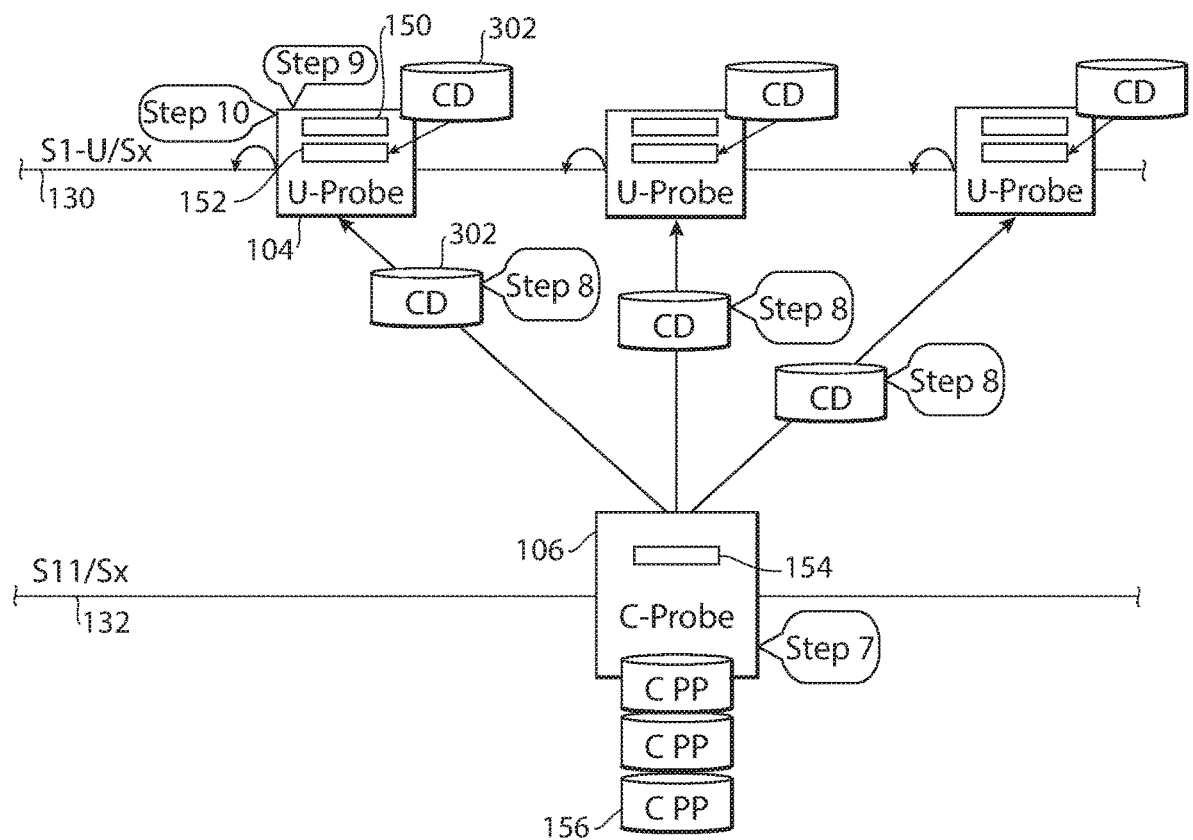
FIG. 3 is a diagram illustrating the network monitoring system during a stage of operation in accordance with embodiments of the present disclosure.

With reference to FIG. 3, a portion of the network monitoring system 100 is shown. At Step 7, each C probe 106 compares the buffered data about the new session received from the network monitor 102 to control plane packets (CPP) buffered in its control plane buffer 156. The C probe 106 performs DPI on the buffered control plane packets to extract SGW-U IP addresses from these packets. The C probe 106 searches for any, if any, matching buffered control plane packets that have SGW-U IP addresses that match an SGW-U IP address included in an entry in its Rx new session data buffer 154. When a matching control plane packet is found, further DPI is performed to extract selected control data (CD) 302 from predetermined fields of the matching control plane packet. The control data selected can include, for example one or more of international mobile subscriber identity (IMSI), mobile station international subscriber directory number (MSISDN), international mobile station equipment identity and software version number (IMEI-SV), Cell-Id., etc.

At Step 8, the C probe 106 sends the control data 302 to the U probe IP address included in the entry of the buffered new packet data that includes the matched SGW-U IP address. In this way, the C probe 106 is sending only the selected control data 302 to a targeted U probe 106 that is monitoring user plane packets associated with control data 302.

At Step 9, the U probe 104 that receives control data 302 stores the control data 302 in a control data buffer 152. The U probe 104 applies predetermined criteria for finding user plane packets in its user plane buffer 150 that correspond to the buffered control plane data. However, in order to account for delays that occur when in receiving control data 302 associated with control plane packets that corresponds to buffered user plane packets, the U probe only attempts to correlate user plane packets that have been buffered for a predetermined, and optionally selectable, delay time based on the timestamp of when they were captured or buffered in the user plane buffer 150. At Step 10, the U probe 104 processes correlated user plane packets and control data, such as to determine statistics, e.g., key performance indicators (KPI), monitor network performance, and/or generate data about the monitoring and/or troubleshooting (which can include the statistics), that can be used to make determinations about troubleshooting, removing and/or adding network components and/or adjusting network parameters, e.g., of components of the network.

The U probes 104 can send information, such as the data about monitoring and/or troubleshooting to the network monitor 102, which can use the data about monitoring and/or troubleshooting to make determinations about troubleshooting, removing and/or adding the network components and/or adjusting the network parameters.

Figure 4:
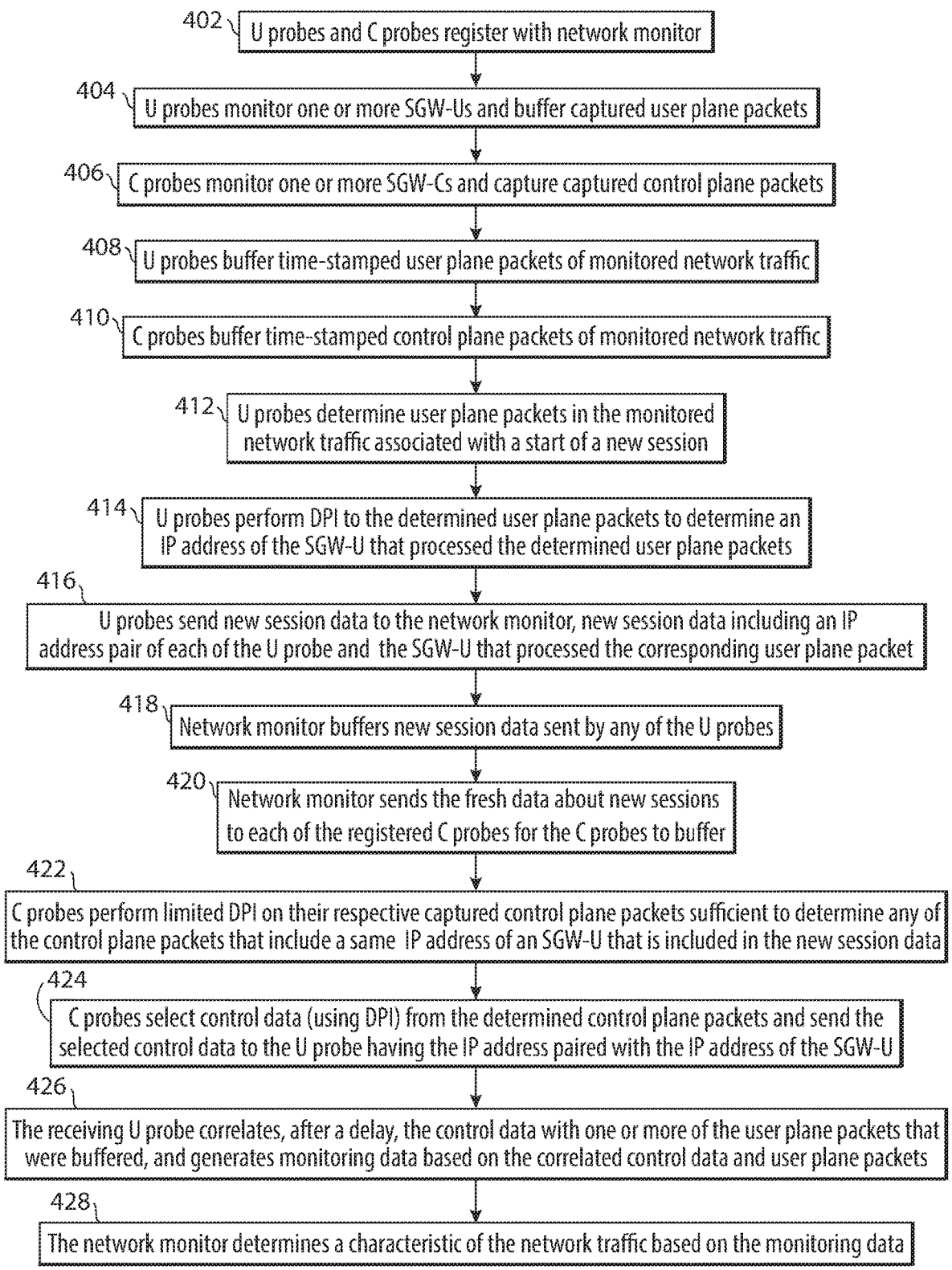
FIG. 4 is a flowchart illustrating of a method performed by the network monitoring system in accordance with embodiments of the present disclosure.

Before turning to description of FIG. 4, it is noted that the flow diagram shown therein is described, by way of example, with reference to components shown in FIGS. 1-3, although these operational steps may be carried out in any system and are not limited to the scenario shown in the aforementioned figures. Additionally, the flow diagram in FIG. 4 illustrates an example in which operations are carried out in a particular order, as indicated by the lines connecting the blocks, but the various operations shown in this diagram can be performed in any order, or in any combination or sub-combination. It should be appreciated that in some embodiments some of the steps described below may be combined into a single operation. In some embodiments, one or more additional operation may be included.

The network monitoring system 100 and the disclosed method can be applied to an access system that uses a variety of protocols, including 4G, 4G-LTE, 5G, and Wi-Fi protocols, or a combination of any of these protocols. Minimal adaptations are needed for the network monitoring system 100 to handle these different protocols. The U probes 104 and network monitor 102 do not need any adaptations, and can operate in the same fashion regardless of the protocol being used. The C probes 106 adapt to the protocol being used by adjusting which information it extracts from the control plane packets to form the control data 302.

With reference now to FIG. 4, shown is a flowchart demonstrating implementation of the various exemplary embodiments. It is noted that the order of operations shown in FIG. 4 is not required, so in principle, the various operations may be performed out of the illustrated order or in parallel. Also certain operations may be skipped, different operations may be added or substituted, or selected operations or groups of operations may be performed in a separate application following the embodiments described herein.

As shown in FIG. 4, at operation 402, U probes and C probes of a network monitoring system, (such as U probes 104 and C probes 106 of network monitoring system 100 of FIG. 1) register with a network monitor (such as network monitor 102 of FIG. 1). Operation 404 includes monitoring one or more SGW-Us, by a plurality of U probes of the registered U probes, and buffering captured user (U) plane packets. Operation 406 includes monitoring one or more SGW-Cs by at least one C probe, and capturing captured control (C) plane packets. Operation 408 includes buffering, by each of the plurality of U probes, timestamped user plane packets of monitored network traffic. Operation 410 includes buffering, by the at least one C probe, timestamped control plane packets of monitored network traffic. Operation 412 includes determining, by each of the U probes, user plane packets in the monitored network traffic that are associated with the start of a new session.

Operation 414 includes the respective U probes performing DPI to the determined user plane packets to determine an IP address of the SGW-U that processed the determined user plane packets. Operation 416 includes sending new session data from the respective U probes to the network monitor, wherein the new session data includes an IP address pair of each of the U probe and the SGW-U that processed the corresponding user plane packet. Operation 418 includes buffering, by the network monitor, new session data sent by any of the U probes. Operation 420 includes periodically, or in response to a trigger, sending fresh data about new sessions from the network monitor to each of the registered C probes for the C probes to buffer.

Operation 422 includes performing limited DPI, by each C probe on its respective captured control plane packets, wherein the DPI is limited, but sufficient to determine any of the control plane packets that include a same IP address as an SGW-U that is included in the new session data. Operation 424 includes, for each determined control plane packet, selecting, by the C probe, control data (using limited DPI) and sending the selected control data to the U probe having an IP address paired with the SGW-U's IP address. Operation 426 includes correlating, by the receiving U probe, after a delay, the control data with one or more buffered user plane packets for generating monitoring data based on the correlated control data and user plane packets. The monitoring data can be used to determine a characteristic of the network traffic. Operation 428 includes the network monitor determining a characteristic of the network traffic based on the monitoring data.

The U probe, for the purpose of correlating the user packets with the control data, limits the DPI performed on the buffered user packets to DPI sufficient for determining a new session and extracting the new session data. The C probe limits the DPI performed on the buffered control plane packets, for the purpose of correlating the user packets with the control data, to DPI sufficient for extracting the control data.

In summary, various embodiments of the present invention are directed to a monitoring system facilitating monitoring of control and user plane traffic in a wireless network. Advantageously, the disclosed method and network monitoring system can correlate user plane packets with information in control plane packets, even when the control plane and user planes are separated physically and/or logically, with minimum toll, if any, on the traffic volume of the access system being monitored due to minimal transmission of data between components of the network monitoring system. The network monitoring system can be easily scaled by adding U probes or C probes that can automatically register themselves with the network monitor to join the network monitoring system. The access system being monitored can use one or more protocols, e.g., 4G, 4GLTE, and 5G, with minimal adaptation needed by only C probes of the network monitoring system. Existing probes in the field can be updated with software to perform the disclosed method, without the need to reconfigure hardware.

The U probes 104 can generate and operate on ASI data. The output by the U probes 104 can be the same as monitoring currently performed in the field. Once the U probes, C probes and network monitor are provided with the software to perform the disclosed method, the network monitoring system will appear to its operators to operate the same way as currently done when monitoring current day 4G or 4G LTE network systems, with the correlation of user plane packets and control data of control plane packets transparent to the operators.

Embodiments of one or more of the network monitor 102, U probe 104, and C probe 106 may be implemented or executed by one or more computer systems. For example, packet analysis system can be implemented using a computer system such as example computer system 500 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Figure 5:
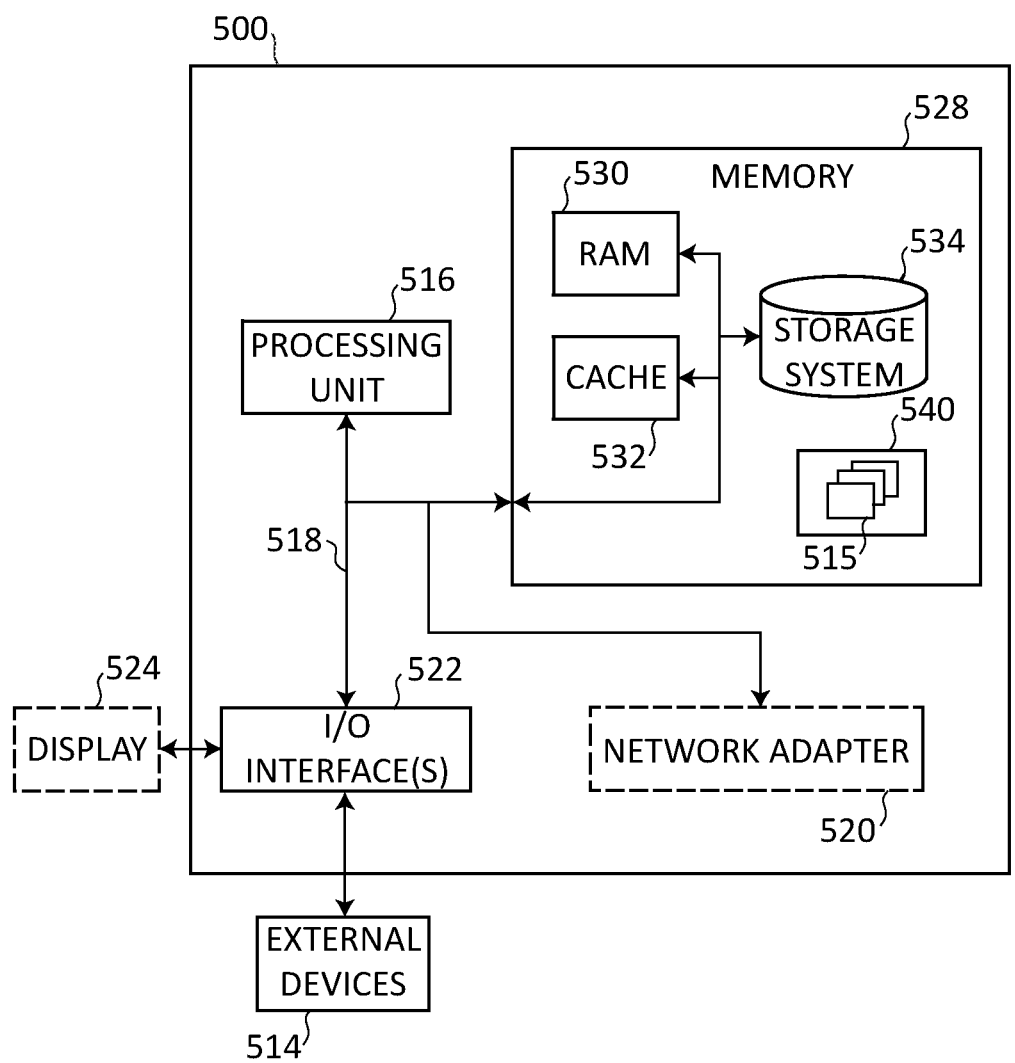
FIG. 5 illustrates a schematic block diagram of an example network computing device that implements one or more of a network monitor and user and control plane probes shown in FIG. 1, in accordance with an illustrative embodiment of the present disclosure.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and PCI bus or a virtual messaging link like MQ (Message Queuing)

Computer system 502 typically includes a variety of computer system readable media. Such media may be any available media that is accessible by the network monitor 102, U probe 104, and C probe 106, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure. In embodiments, buffer 214 shown in FIG. 2 may be included in memory 528.

Program/utility 540, having a set (at least one) of program modules 515, such as the AS session record manager 110, the NAS session record manager 112, and the mediator 114, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable the network monitor 102, U probe 104, and C probe 106 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. For example, network monitor 102, U probe 104, and C probe 106 may use network adapter 520 to communicate with each other via a network, such as a network that includes data paths 110. As depicted, network adapter 520 communicates with the other components of the network monitor 102, U probe 104, and C probe 106 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

Some of the components can be optional in embodiments of one or more of the network monitor 102, U probe 104, and C probe 106. For example, the network adapter 520 and display 524 are shown in dotted lines to indicate that they can be optional components.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof. Additional description of the illustrated embodiments are attached as Appendix A.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for correlating user plane and control plane data, the system comprising:
a network monitor configured to communicate with a plurality of U probes and a plurality of C probes associated with the network monitor, the U probes being configured to monitor at least one SGW-U operating on user plane traffic of network traffic and the C probes being configured to monitor at least one SGW-C operating on control plane traffic of the network traffic;
the plurality of U probes configured to buffer user plane packets captured from the at least one SGW-U, determine each of the captured user plane packets that are associated with respective new sessions, and send to the network monitor new session data based on the user plane packets determined to be associated with the respective new sessions, the new session data including an IP address pair of each of the U probe and the SGW-U that processed the corresponding user plane packet; and
the plurality of C probes configured to communicate with the network monitor and at least a portion of the plurality of U-probes, receive the new session data from the network monitor, inspect control plane packets captured from the at least one SGW-C, determine one or more control plane packets of the captured control plane packets having a same IP address as an SGW-U that is included in the new session data, and send control data associated with the one or more determined control plane packets to a particular U probe of the plurality of U probes having the IP address paired with the IP address of the SGW-U,
wherein the particular U probe is further configured to correlate the control data with one or more of the user plane packets that were buffered, and generate monitoring data based on the correlated control data and user plane packets.

2. The system of claim 1, wherein the plurality of C probes is further configured to select predetermined fields from the control plane packet to be included in the control data.

3. The system of claim 1, wherein the selected predetermined fields include fields for holding information about at least one of international mobile subscriber identity (IMSI), mobile station international subscriber directory number (MSISDN), international mobile station equipment identity and software version number (IMEI-SV), and Cell-Id.

4. The system of claim 1, wherein the plurality of U probes is further configured to buffer the user plane packets with respective timestamps indicating a time of being captured or buffered, and the particular U probe waits a predetermined delay time from the timestamp that a user packet was received before correlating that user packet with the control data.

5. The system of claim 1, wherein the network monitor sends all unsent new session data periodically to all of the C probes of the plurality of C probes, wherein previously sent new session data is considered as old session data.

6. The system of claim 1, wherein the network monitor monitors one or more of 5G, 4G, and Wi-Fi protocols.

7. The system of claim 6, wherein the system further includes a new U probe that was added to the plurality of U probes by registering itself with the network monitor during operation of the network and performing functions for which the plurality of U probes are configured.

8. The system of claim 6, wherein the system further includes a new C probe that was added to the plurality of C probes by registering itself with the network monitor during operation of the network and performing the functions for which the plurality of C probes are configured.

9. The system of claim 2, wherein the particular U probe is configured to perform deep packet inspection in order to access fields in the buffered user plane packets that correspond to fields included in the content data.

10. The system of claim 2, wherein the plurality of C probes are configured to perform deep packet inspection in order access the predetermined packets from the control plane packets.

11. The system as recited in claim 1, wherein the monitoring data includes Adaptive Service Intelligence (ASI) data.

12. The system as recited in claim 1, wherein at least one of the network monitor and the particular U probe uses the monitoring data to determine a characteristic of the network traffic.

13. The system as recited in claim 12, wherein the characteristic of the network traffic includes at least one of quality of service, performance, and end user experience.

14. The system as recited in claim 1, wherein the plurality of U probes receive the captured user plane packets via a tap that monitors the SGW-U.

15. The system as recited in claim 1, wherein the plurality of C probes receive the captured control plane packets via a tap that monitors the SGW-C.

16. The system as recited in claim 2, wherein the plurality of C probes are adapted to a protocol being used by the network, wherein adapting the plurality of C probes includes adjusting the predetermined fields for selecting information from the control plane packets to be included in the control data.

17. The system as recited in claim 1, wherein the particular U probe performs deep packet inspection to determine whether a user packet is associated with a new session and for obtaining the new session data.

18. The system as recited in claim 1, wherein the particular U probe, for the purpose of correlating the user packets with the control data, limits the deep packet inspection performed on the buffered user packets to deep packet inspection needed for determining a new session and extracting the new session data.

19. The system as recited in claim 1, wherein inspecting by the plurality of C probes, for the purpose of correlating the user packets with the control data, includes performing deep packet inspection.

20. The system as recited in claim 19, wherein the plurality of C probes limit the deep packet inspection performed on the buffered control plane packets, for the purpose of correlating the user packets with the control data, to deep packet inspection needed for extracting the control data.

21. A method performed by a network monitor for correlating user plane and control plane data, the method comprising:
receiving, from a plurality of U probes that detected one or more new sessions, new session data that includes data about the detected one or more new sessions, wherein the plurality of U probes are configured to monitor at least one SGW-U operating on user plane traffic of network traffic and buffer user plane packets captured from the at least one SGW-U, and wherein the new session data includes an IP address pair of each of the U probe and the SGW-U that processed a user plane packet that is associated with a start of a new session;
buffering the new session data;
sending the new session data to a plurality of C probes associated with the network monitor, wherein the plurality of C probes are configured to monitor at least one SGW-C operating on control plane traffic of the network traffic, buffer and perform deep packet inspection on captured control plane packets of the control plane traffic, determine one or more control plane packets of the captured control plane packets having a same IP address as an SGW-U that is included in the new session data, and send control data associated with the one or more determined control plane packets to a particular U probe of the plurality of U probes having the IP address paired with the IP address of the SGW-U; and
receiving, from the particular U probe, monitoring data based on the correlated control data that can be used to determine a characteristic of the network traffic, wherein the U probe is configured to correlate, after a delay, the control data with one or more user plane packets that were buffered for providing the monitoring data.

22. The method of claim 21, wherein the method further includes periodically sending all new session data that was not sent yet about the at least one new session to all of the C probes of the plurality of C probes, wherein previously sent new session data is considered as old session data.

23. The method of claim 21, wherein the method further comprises using the monitoring data to determine a characteristic of the network traffic, wherein the characteristic of the network traffic includes at least one of quality of service, performance, and end user experience.

24. A method performed by a C probe of a plurality of C probes for correlating user plane and control plane data, the method comprising:
receiving from a network monitor to which the C probe is associated new session data, wherein the new session data was provided to the network monitor by a plurality of U probes that detected one or more new sessions, wherein the plurality of U probes are configured to monitor at least one SGW-U operating on user plane traffic of network traffic and buffer user plane packets captured from the at least one SGW-U, and wherein the new session data includes an IP address pair of each of the U probe and the SGW-U that processed a user plane packet that is associated with a start of a new session;
monitoring at least one SGW-C operating on control plane traffic of the network traffic;
capturing and buffering control plane packets of the control plane traffic;
performing deep packet inspection on the captured control plane packets, wherein the deep packet inspection is limited to deep packet inspection needed to access IP addresses;
determining one or more control plane packets of the captured control plane packets having a same IP address as an SGW-U that is included in the new session data;
selecting control data from the one or more determined control plane packets;
sending only the selected control data to a particular U probe of the plurality of U probes, wherein the particular U probe has an IP address associated with the SGW-U's IP address and the particular U probe is configured to correlate, after a delay, the selected control data with one or more of the user plane packets that were buffered for providing to the network monitor monitoring data that is based on the correlated control data that can be used to determine a characteristic of the network traffic.

25. The method of claim 24, wherein the selected control data is obtained from predetermined fields of the control plane packets, wherein the predetermined fields include fields for holding information about at least one of international mobile subscriber identity (IMSI), mobile station international subscriber directory number (MSISDN), international mobile station equipment identity and software version number (IMEI-SV), and Cell-Id.

26. A method performed by a U probe of a plurality of U probes for correlating user plane and control plane data, the method comprising:
monitoring at least one SGW-U operating on user plane traffic of network traffic;
buffering user plane packets captured from the at least one SGW-U;
determining each of the captured user plane packets that are associated with respective new sessions;
sending to the network monitor new session data based on the user plane packets determined to be associated with the new session, wherein the new session data includes an IP address pair of each of the U probe and the SGW-U that processed the corresponding user plane packet;

receiving control data from one or more C probes, wherein the plurality of C probes are configured to monitor at least one SGW-C operating on control plane traffic of the network traffic, buffer and perform deep packet inspection on captured control plane packets of the control plane traffic, determine one or more control plane packets of the captured control plane packets having a same IP address as an SGW-U that is included in the new session data, and send control data associated with the one or more determined control plane packets to a particular U probe of the plurality of U probes having the IP address paired with the IP address of the SGW-U;

correlating the control data with one or more user plane packets that were buffered;

generating monitoring data based on the correlated control data; and providing the monitoring data to the network monitor for determination of a characteristic of the network data.

\* \* \* \* \*